United States Patent [19]
Maimstrom et al.

[11] 3,866,925
[45] Feb. 18, 1975

[54] DEVICE FOR INCREASING THE ELASTIC FORCE OF AND REINFORCING OBJECTS MANUFACTURED FROM AN ELASTIC MATERIAL

[75] Inventors: Sven-Erik Maimstrom, Naters; Sten Sporre, Forsheda, both of Sweden

[73] Assignee: Forsheda Ideutveckling AB, Varnamo, Sweden

[22] Filed: Jan. 30, 1973

[21] Appl. No.: 328,025

[30] Foreign Application Priority Data
Jan. 31, 1972 Sweden................ 1048/72
June 5, 1972 Sweden................ 7335/72
June 19, 1972 Sweden................ 8023/72
Oct. 6, 1972 Sweden................ 12905/72

[52] U.S. Cl................ 277/164, 285/230, 161/47, 277/164, 277/235 R
[51] Int. Cl............................................. F16j 15/12
[58] Field of Search........ 277/164, 207, 235 R, 153, 277/163; 267/33, 1.5; 285/230, 231, 235, 237, 345, DIG. 11; 161/47

[56] References Cited
UNITED STATES PATENTS
2,948,527  8/1960  Gilbert................ 277/164
3,183,010  5/1965  Bram................ 277/235
3,468,527  9/1969  Mather................ 277/235
3,744,806  7/1973  Keyser................ 285/230
3,787,061  1/1974  Yoakum................ 277/207

*Primary Examiner*—Samuel B. Rothberg
*Assistant Examiner*—Robert I. Smith
*Attorney, Agent, or Firm*—Albert L. Jeffers; Roger M. Rickert

[57] ABSTRACT

The invention relates to objects composed of elastic material such as flattened helix or coil spring for a reinforcing or strengthening means wherein the reinforcing or strengthening means can be two helix or coil springs rolled together, one of the springs having a right-hand helix and the other a left-hand helix. If desired the strengthening and reinforcing means can be embedded within the elastic material such as a rubber sealing ring or it can be arranged on the outside of the object such as a hose clamp. Dependent upon the function and application of the object, the spring can have the form of a substantially flat ring, a hollow cylinder or a frustum of a hollow cone.

21 Claims, 19 Drawing Figures

DEVICE FOR INCREASING THE ELASTIC FORCE OF AND REINFORCING OBJECTS MANUFACTURED FROM AN ELASTIC MATERIAL

The present invention relates to objects which are composed of elastic material, preferably rubber sealing rings, comprising strengthening means.

It is often desirable to strengthen and reinforce objects of elastic material, and it is previously known to embed within the elastic material reinforcing and strengthening means of different kinds, for example coil or helix springs. However, the possibilities of using such springs for reinforcing and strengthening objects composed of elastic material are limited because of the fact that the space available for objects of this kind, usually sealing rings and the like, is often very restricted and the strengthening and reinforcing elements now used make the objects too large or have to be made so small that they cannot reinforce and strengthen the objects to a sufficient degree.

Thus, the object of the invention is to provide objects composed of elastic material and including means for increasing the elastic force of reinforcing and strengthening the objects.

In accordance with the invention there is provided an elastic material object comprising a flattened helix or coil spring which constitutes a reinforcing or strengthening means. The reinforcing and strengthening means can comprise two helix or coil springs rolled together, one of the springs having a right-hand helix and the other having a left-hand helix.

It is preferred that the helix or coil springs have substantially circular coils before they are flattened.

The strengthening and reinforcing means can be embedded within the elastic material object, for example within a rubber sealing ring, but can also be arranged on the outside of the object, for example around a hose to be used as a hose clamp.

In the case that the object is a sealing ring the strengthening and reinforcing spring is annular, and dependent on the application or desired function the spring can have the form of a substantially flat ring, a hollow cylinder or a frustum of a hollow cone.

The invention is described in the following with reference to the drawings.

Figure 1:
FIG. 1 is a side view of a strengthening spring for an object in accordance with the invention.
Figure 2:
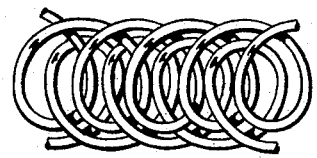
FIG. 2 is a side view of an other embodiment of a strengthening spring.

In FIGS. 1 and 2 there are shown two different embodiments of reinforcing and strengthening springs intended to be used in connection with an object in accordance with the invention.

In accordance with FIG. 1 the strengthening spring consists of a helix or coil spring manufactured from metal wire and flattened to the shape of a strip. Because of the strip shape of the strengthening spring there are obtained a number of advantages more in detail appearing from the description of the different objects in which the strengthening device is included. However, it can be mentioned that a spring which consists of a helix or coil spring flattened to a strip in a position embedded within an elastic material, for example rubber, together with the elastic material constitutes an elastic element in which portions of the elastic material are subject to a pressure force which is the most advantageous kind of stressing of elastic material, especially rubber, when the elastic element is subject to a tensile stress.

In FIG. 2 there is shown a strengthening spring constituted by rolling together two helix or coil springs, having their coils extending in different directions, i.e., one right-handed helix, and one left-handed helix. A spring element of this kind is very compact and strong, has relatively continuous side edges and has many other advantages, for example a small open area.

Figure 3:
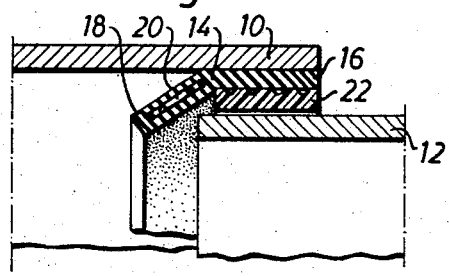
FIG. 3 is a section of the walls of two pipes connected with each other by means of a sealing device including a strengthening spring in accordance with the invention.

In FIG. 3 there is shown a section through the wall of a pipe socket 10 and a spigot end 12 which are to be sealed in relation to each other. Before the spigot end is inserted into the socket 10, the socket is provided with a sealing device comprising a sealing ring 14. The sealing ring 14 has an attachment portion 16 and a sealing portion 18 connected therewith. Within the sealing ring there is embedded a strip shaped annular spring 20, having the form of the frustum of a hollow cone in the unstressed condition. The spring strip can be designed in accordance with the embodiment shown in FIG. 2 The attachment portion 16 of the sealing ring 14 is pressed against the inner surface of the socket 10 by means of a plastic ring 22. When the spigot 12 is inserted into the socket 16 provided with the sealing device the sealing portion 18 is resiliently pushed aside, and after the insertion of the spigot 12 into the socket 10 the sealing portion 18 is pressed against the outer surface of the spigot end 12 with relatively great force by the spring element 20. Thus, the sealing ring constitutes a lip seal resisting high inner pressures. Because of the spring element 20 the rubber material can have relatively small dimensions maintaining a high contact pressure against the outer surface of the spigot.

Figure 4A:
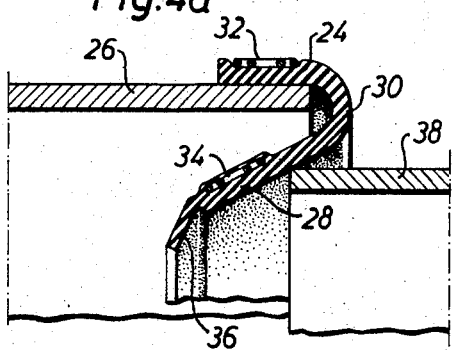
FIGS. 4a and 4b are sections of another sealing arrangement between two pipes including a strengthening spring in accordance with the invention.
Figure 4B:
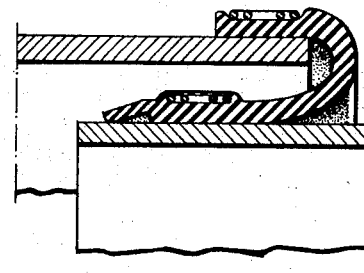

In FIGS. 4a and 4b a strengthening spring is incorporated in the sealing portion as well as the attachment portion of a sealing ring. The attachment portion 24 of the sealing ring contacts the outer surface of the edge portion of a socket 26. The sealing ring has a sealing portion 28 and a connector portion 30 between the attachment portion 24 and the sealing portion 28. The attachment portion 24 is pressed against the socket 26 by means of a spring element 32 provided in a depression in the rubber material of the attachment portion 24. Of course it is also possible to embed the spring element within the rubber material. Also the sealing portion 28 is provided with a spring element 34. In the unstressed condition the spring element 34 has the shape of a frustum of a hollow cone. The spring element 34 is embedded within a second portion of the rubber material. The sealing portion 28 of the sealing ring has a sealing lip 36 for increasing the sealing effect. When the spigot end 38 is inserted into the sealing ring the sealing portion 28 thereof is expanded against the action of the spring element 34 to the position shown in FIG. 4b. The spring elements 32 and 34 press the attachment portion as well as the sealing portion against the socket and the spigot, respectively, with sufficient force for maintaining the sealing action. The connector portion 30 is so formed that great deviations from the correct dimensions, eccentricity and the like can be managed by the sealing device.

Figure 5:
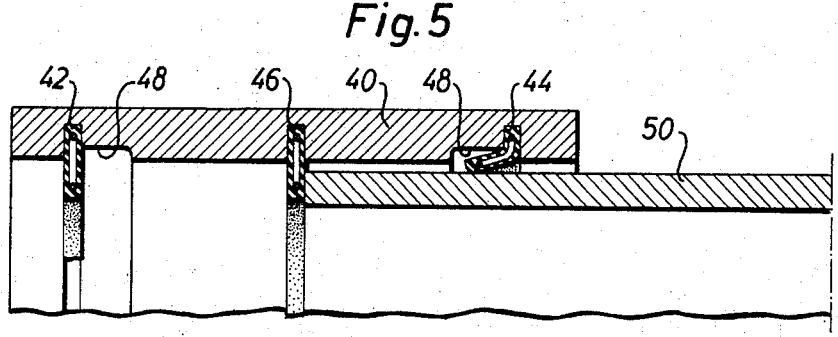
FIG. 5 is a section of a further sealing arrangement including a strengthening spring in accordance with the invention.

In FIG. 5 there is shown a socket for connecting two straight pipes (pipes without a socket) with each other. The socket 40 has two sealing rings 42 and 44 and a stop ring 46. The rings are substantially flat and consist of rubber and strip shaped spring elements embedded therein. The rings are positioned in grooves in the socket. Inside the two sealing rings 42 and 44 the socket is provided with grooves 48 shallower and broader than the attachment grooves, the rings being resiliently flexed into the grooves 48 when a spigot end is inserted into the socket. In FIG. 5 there is shown only one spigot end 50 contacting the stop ring 46 while the other sealing ring 42 is shown in an unstressed condition. The spring elements embedded in the rings provide a high contact pressure against the outer surfaces of the spigot ends positioned in the socket.

Figure 6:
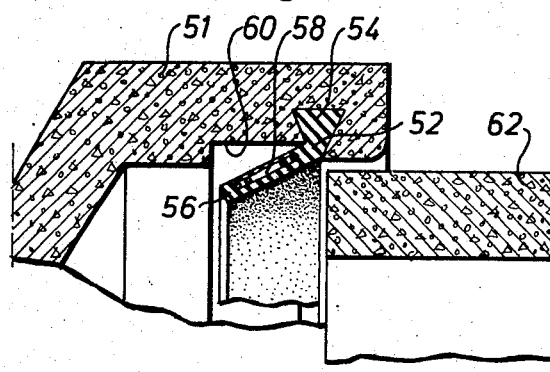
FIG. 6 is a section of a further sealing arrangement including a strengthening spring in accordance with the invention.

In FIG. 6 there is shown a portion of a pipe socket 51 provided with a sealing ring 52 having a portion 54 molded into the pipe socket. The sealing portion 56 of a sealing ring is provided with a spring element 58 having the shape of a frusted hollow cone in the unstressed condition. Inside the point where the sealing ring is molded into the socket 51 the socket has a cavity 60 corresponding to the sealing portion 56 of the sealing ring. The pipe socket can be manufactured by arranging the sealing ring 52 on a mold surface intended for forming the inner surface of the socket 51, whereby the sealing ring 52 will be molded into and from the socket 51 as shown when the concrete is supplied to the mold. When said form surface is removed the sealing portion 56 springs out to the shown position. When a spigot end 62 is then inserted into the socket 51 the sealing portion 56 is pressed against the outer surface of the spigot end because of the spring element 58 so that the sealing portion 56 sealingly engages said outer surface of the spigot.

Figure 7:
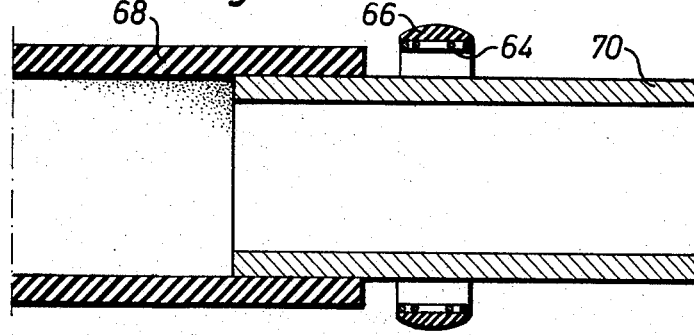
FIG. 7 is a section showing a hose including a hose clamp in accordance with the invention.

FIG. 7 illustrates the use of the strengthening device as a hose clamp. For this purpose there is used a spring element 64 having the shape of a hollow cylinder. The annular spring is manufactured with less diameter than the hose for which the hose clamp is to be used in order to provide for the required pressing force. Thereupon the spring is expanded on a mandrel to a diameter corresponding to the outer diameter of the hose. The spaces between the metal wires of the spring is filled wholly or partly with a material 66 providing that the spring is retained in its expanded position after the removal of the mandrel. In this condition the hose clamp constituted by the spring can without any problems be positioned around a hose 68 provided around a pipe 70 and intended to be pressed against the pipe. After the hose clamp has been positioned around the hose the material 66 retaining the hose clamp in expanded position is removed whereby the hose clamp is pressed against the hose for sealingly pressing the hose 68 against the pipe 70.

The material 66 retaining the spring element 64 in the expanded position can be of different kinds and can for example consist of a material which as a strip can be torn away from the spring element when the expansion thereof is to be cleared away. A material of this kind is plastic, for example ployvinyl chloride. Another possibility of removing the material is by heating or by means of any solvent. For example it is possible to use a metal having a low melting point.

Figure 8:
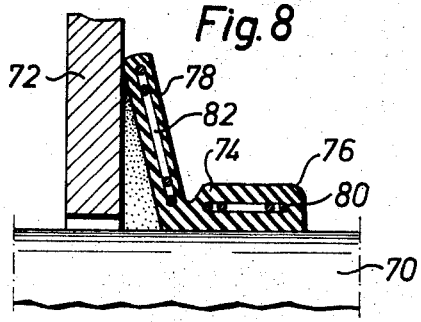
FIG. 8 is a section showing the strengthening spring in accordance with the invention in connection with a sealing arrangement for a rotating shaft.

FIG. 8 shows a sealing device between a rotatable shaft 70 and a stationary wall 72 through which the shaft extends. The seal consists of a ring 74 having an attachment portion 76 and a sealing portion 78. The attachment portion 76 encloses the shaft and is pressed against the shaft by a spring element 80 embedded within the attachment portion and having the shape of a hollow cylinder. The sealing portion 78 is formed in one piece with the attachment portion 76 and engages said wall 72 at its outer end. The contact force of the sealing portion 78 against the wall 72 is increased by a spring element 82 which in unstressed consists of the frustum of a cone having an angle at the basis which is somewhat greater than the angle of spring element in the stressed position shown on the drawing.

Figure 9:
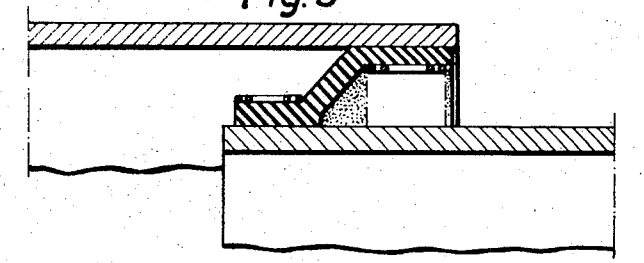

FIG. 9 illustrates a sealing arrangement between a socket and a spigot end wherein the sealing ring is substantially Z-shaped and is pressed against the inner surface of the socket and the outer surface of the spigot end by means of spring elements in accordance with the invention.

Figure 10:
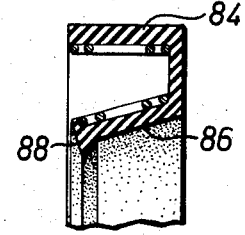
FIGS. 9–14 are sections showing further sealing arrangements including a strengthening spring in accordance with the invention.

FIG. 10 illustrates a sealing ring having a substantially U-shaped section. The ring is intended to seal between a shaft and a bearing housing, the outer portion 84 of the sealing ring intended to be pressed against the inner surface of the bearing housing. The inner portion 86 contacts a shaft rotating in the bearing housing with a pointed portion 88, thus constituting a radial seal. Both of the portions 84 and 86 are reinforced and strengthened by means of devices in accordance with the invention.

Figure 11:
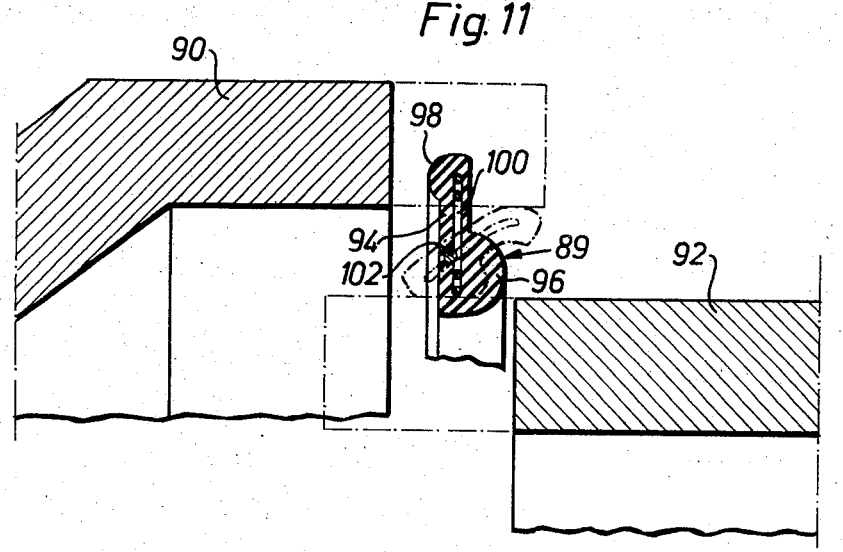

FIG. 11 illustrates a sealing ring 89 intended for sealing between a socket 90 and a spigot 92. The ring has a flat central portion 94 and a peripheral inner bead 96 and a peripheral outer bead 98 pointing in opposite axial directions. In accordance with the invention an annular spring element 100 is embedded within the central flat portion 94. The spring element 100 is provided with a continuous metal ring 102 constituting a tilting center for the section of the annular spring. Because of the fact that the metal ring 102 can neither increase nor decrease its length the tilting center of the sealing ring will be positioned at the point where the ring 102 is positioned giving the possibility of positioning said tilting center to the desired place of the section of the spring 100. When the spigot end 92 is inserted into the socket 90 the sealing ring 89 will take the position shown in broken lines.

Figure 12:
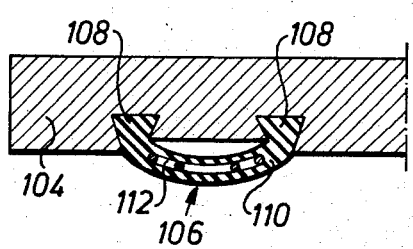

FIG. 12 illustrates a sealing ring 106 molded into a socket 104. The sealing ring has two attachment portions 108 positioned at an axial distance from each other. The attachment portions are molded into the concrete at such a distance from each other that the sealing portion 110 positioned between the attachment portion will project from the inner surface of the socket 104. The sealing portion 110 is reinforced by means of a spring element 112 embedded within the sealing portion. When a spigot end is inserted into the socket 104 the outer surface of the spigot engages the projecting sealing portion 110 which is resiliently pressed against the outer surface of the socket.

Figure 13:
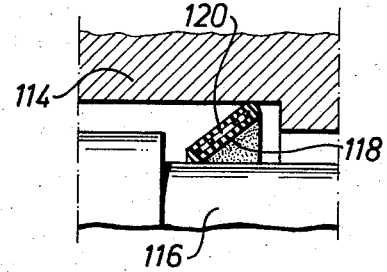

FIG. 13 illustrates a sealing ring 118 between a bearing housing 114 and a shaft 116. A spring element 120 is embedded within the sealing ring. The spring element strives to take a more flat position than the position shown in the drawing and thereby providing for a sufficient contact pressure against the sealing surfaces.

Figure 14:
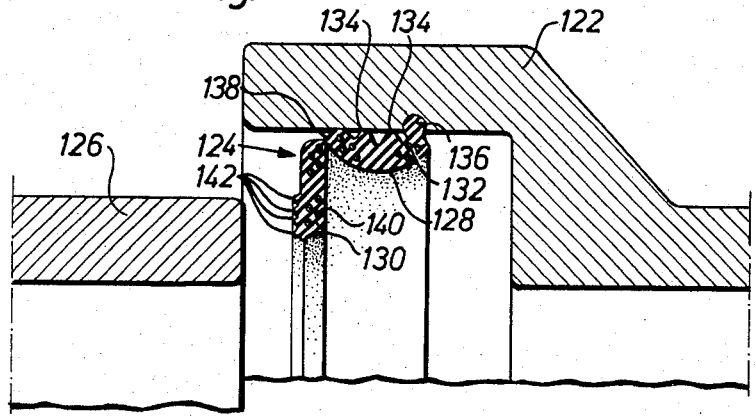

In FIG. 14 there is shown an axial section of the wall of a socket 122, a sealing ring 124 positioned in the socket and a spigot end 126 intended to be inserted into the socket. The sealing ring 124 has an attachment and sealing portion 128 adapted to be attached in and to seal against the inner surface of the socket 122 and has a sealing portion 130 adapted to seal against the outer surface of the spigot end 126. A spring 132 is incorporated in the portion 128. The spring 132 is substantially strip shaped and consists of two helix or coil springs rolled together, preferably one left-hand helix and one right-hand helix spring. The portion 128 has a somewhat arched shape in the axial section, and the spring 132 embedded within this portion conforms to this shape. At its concave surface the portion 128 has peripheral projections 134 and 136, the projections 134 being intended to engage the inner surface of the socket 122 and the projection 136 being intended to engage in a groove formed in the socket in order to improve the locking of the sealing ring in the axial direction. The spring 132 presses the sealing ring 124 against the inner surface of the socket 122 and because of the mentioned, arched shape there is obtained a relatively great spring distance in the radial direction The sealing portion 130 is by means of a hinge portion 138 connected with the portion 128 and has the shape of a flat ring in the unstressed condition of the sealing ring 124. The spring 140 embedded within the portion 130 is of substantially the same kind as the spring 132, i.e., a spring consisting of two helix or coil springs rolled together. Because of its flat shape the spring 140 strives to retain the portion 130 in the position in FIG. 14. The end section of the portion 130 is provided with a number of projections 142 adapted to improve the sealing against the outer surface of the socket 126.

When the spigot end 126 is inserted into the socket 122 provided with the sealing ring 124, the portion 130 is tilted in the direction of the portion 128 around the hinge 138 against the action of the spring 140. After the insertion of the spigot end the sealing device can have the appearance of FIG. 15.

Figure 15:
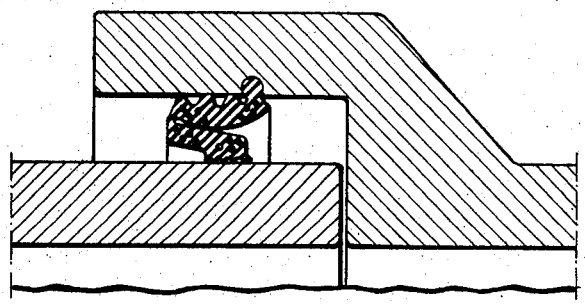
FIGS. 15 and 16 are sections of a sealing device including strengthening springs in accordance with the invention.

It is realized that the sealing ring shown in FIGS. 14 and 15 can adjust to great dimensional deviations of the socket and the spigot. The pressure within the pipe will contribute to the pressing of the portions 128 and 130 against the inner surface of the socket and the outer surface of the spigot end, respectively.

Figure 16:
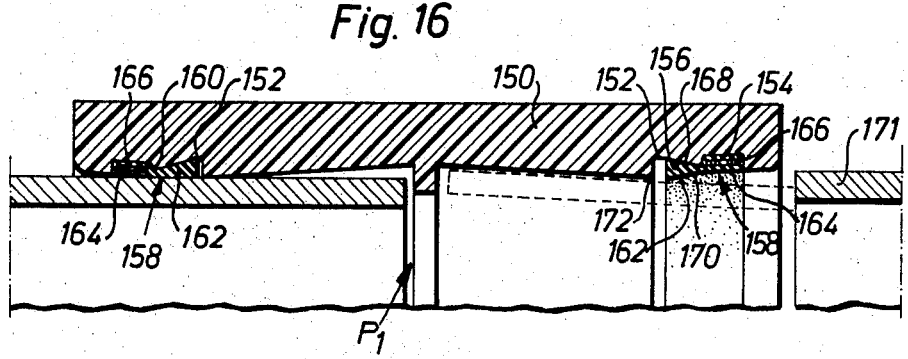

In FIG. 16 reference numeral 150 designates a socket consisting of plastic for connecting straight pipes (pipes without sockets) with each other. Two grooves 152 are formed at the ends of the socket. Each groove comprises two sections, one section 154 having a substantially rectangular shape with a radial depth less than half the axial length and one section 156 having a substantially triangular shape. A sealing ring 158 consisting of rubber is positioned in the groove 152. The sealing ring 158 comprises two portions, a sealing portion 162 and an attachment portion 164, connected with each other by means of a hinge portion 160. The attachment portion is reinforced and strengthened by means of a flattened coil or helix spring 166 preferably comprising two springs, one left-hand helix and one right-hand helix spring. The two springs constitute one single flat spring having certain qualities making it suitable for reinforcing rubber especially in connection with sealing arrangements. With regard to the sealing action it is advantageous that the sealing ring 162 itself is manufactured from soft rubber material, about 35°–40°. Rubber of this quality has the drawback that it can be pressed through clearances, also relatively narrow clearances. It is therefore usual to use a harder rubber renouncing the sealing function to be able to satisfy the demand for a stiffer attachment portion. By reinforcing the soft rubber with a spring of the kind defined above it is possible to retain a better sealing function while providing the attachment portion with sufficient stability and hardness.

The reinforcing spring also makes the attachment portion very easy to mount. The ring is given heart or kidney shape, is introduced into the socket and is allowed to snap out so that the attachment portion 164 snaps into its grooves 154.

The sealing portion 162 is defined by an outer surface 168 and an inner surface 170 which are inclined in relation to each other for giving the sealing portion the section of an equilateral triangle having a point angle of about 25°. Outwards the groove 154 is restricted by a conical surface making an angle of about 15° with the longitudinal axis. Thus, the angle difference is about 10 degrees so that the inner surface 170 of the sealing portion is conical in the direction of the center as shown in the right portion of FIG. 16. A pipe 171 is mounted in the socket 150 by being pushed into the socket. Thereby the pipe contacts the sealing portion 162 which is compressed at further movement of the pipe. The sealing portion 162 is elongated to a position as shown in the left portion of FIG. 16. An inner pressure $P_1$ presses the sealing portion 162 outwards to increase the compression and make leakage impossible. The higher pressure the higher sealing pressure. As high pressure pipe for water under certain circumstances can be pressureless from inside and be subjected to the underground water pressure it is necessary that a seal of this kind can stand an outer pressure of about 1 kb/cm². The dimensions of the sealing portion 162 are chosen so in relation to the groove that it is compressed at least 30 percent. This compression is sufficient for taking up an inclination of the pipe in relation to the socket of up to 3°. Thereby the pipe 171 is in the position shown with broken lines in the right part of FIG. 16. As appears from the drawing the center of rotation is positioned just inside the groove 156 at the point designated with reference numeral 172.

Thereby the influence of the inclination on the compression is reduced to a minimum.

Figure 17:
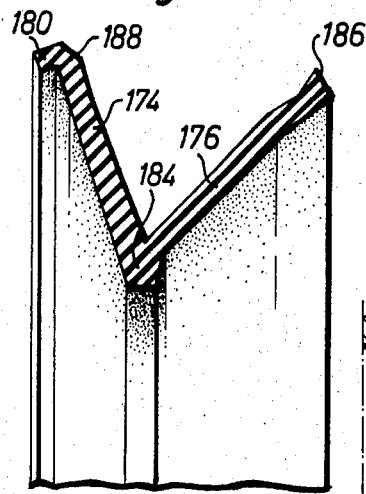
FIGS. 17 and 18 are partial sections of a sealing ring and a sealing arrangement, respectively, in accordance with the invention.

FIG. 17 is an axial section of a rubber ring intended to constitute together with a spring a sealing device for sealing between two cylindrical surfaces positioned substantially concentrically in relation to each other. The wall of the rubber ring is substantially V-shaped having two legs 174 and 176. Rings of this kind can in a simple way be manufactured on a mandrel by means of a divided outer mold portion.

Figure 18:
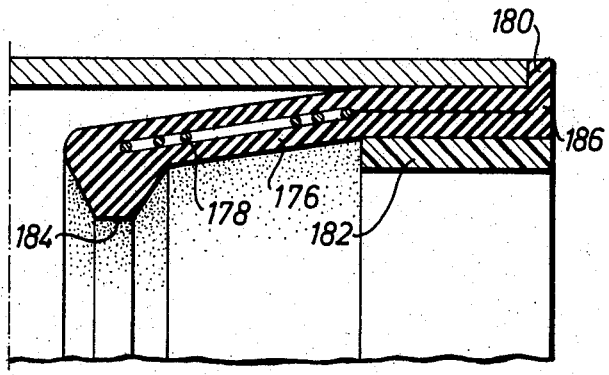

Between the legs 174 and 176 there is formed a pocket for receiving a spring strip consisting of a helix or coil spring 178 flattened to the form of a strip. After the positioning of the spring strip 178 in the pocket between legs 174 and 176 the legs are put together so that they sealingly engage at its end portions. As shown in FIG. 18 the sealing ring so formed can be positioned in a pipe socket, the leg 174 having a flange 180 contacting the end surface of the socket. The outer portions of the legs are pressed against each other by means of a ring 182, for example manufactured from plastic and slitted in the axial direction at a number of points. A spigot end inserted into the socket provided with the sealing device makes the inner portion 184 of the ring engage the outer surface of the spigot end, the engagement therewith being provided by the action of the spring strip 178. In order to prevent that the leg 176 is forced into the socket by the spigot end it is provided with a projection 186 engaging a chamfer 188 on the leg 174.

Various modifications, adaptations and variations of the foregoing specific disclosrue can be made without departing from the teachings of the present invention as appearing from the following claims.

We claim:

1. An object composed of elastic material and provided with strengthening means embedded within said elastic material, wherein the strengthening means comprise a spring element comprising a flattened helix or coil spring having its windings positioned within a plane substantially parallel with the longitudinal axis of the object, said windings being positioned to enclose portions of the elastic material so that the enclosed portions are subject to a compression when the object and the spring element are subject to a tensile stress.

2. An object as claimed in claim 1, in which the spring element comprises two flattened helix springs rolled together, one having a right-hand helix and the other having a left-hand helix.

3. An object as claimed in claim 1, in which the spring element has in the unstressed state the shape of a substantially flat ring.

4. An object as claimed in claim 1, in which the spring element has in the unstressed state the shape of a hollow cylinder.

5. An object as claimed in claim 1, in which the spring element has in the unstressed state the shape of the frustum of a hollow cone.

6. An object as claimed in claim 1, the object constituting a sealing ring comprising an attachment and sealing portion formed as a hollow cylinder and a sealing portion hingedly connected with the attachment and sealing portion and formed as a substantially flat ring.

7. An object as claimed in claim 6, in which the attachment and sealing portion is adapted to be attached to and seal against the inner surface of a pipe socket and the sealing portion is adapted sealingly to engage the outer surface of a spigot end inserted into the pipe socket.

8. An object as claimed in claim 7, in which the attachment and sealing portion has an inwardly projecting convex shape.

9. An object as claimed in claim 8, in which the attachment portion as well as the sealing portion is provided with the spring elements.

10. An object as claimed in claim 1, the object constituting a sealing ring comprising a sealing portion and an annular attachment portion connected with each other, the spring element being embedded within the attachment portion.

11. An object as claimed in claim 10, in which the attachment portion and the sealing portion have a common cylindrical outer surface.

12. An object as claimed in claim 11, in which the attachment portion and the sealing portion are adapted to be positioned in grooves formed in the inner surface of an outer pipe concentrically surrounding an inner pipe.

13. An object as claimed in claim 12, in which the sealing portion is adapted to be positioned axially inside the attachment portion from the edge portion of the outer pipe.

14. An object as claimed in claim 10, in which the sealing portion has the section of an equilateral triangle having a point angle of 15° to 30°, and said sealing portion having its apex connected to said attachment portion.

15. An object as claimed in claim 10, in which the sealing portion and the attachment portion are connected with each other by means of a portion having reduced thickness.

16. An object as claimed in claim 10, in which the attachment portion has the section of a rectangle, the radial dimension thereof being less than half of the axial dimension thereof.

17. An object as claimed in claim 1, in which the spring element engages the outer surface of the object.

18. An object as claimed in claim 17, in which the spring element is fixed in an expanded state by means of removable spacing elements positioned between the coils of the spring element.

19. An object as claimed in claim 18, in which the spacing elements are connected with each other constituting a strip tearable from the spring element.

20. An object as claimed in claim 18, in which the spacing elements consist of a material meltable by means of heat or a solvent.

21. An object as claimed in claim 1, in which the spring element has a continuous wire extending along the spring element and connected with the coils thereof, said wire defining the tilting center of the spring element.

* * * * *